United States Patent [19]

Stalter, Sr. et al.

[11] Patent Number: 5,088,798
[45] Date of Patent: Feb. 18, 1992

[54] COMPOSITE METAL-ELASTOMER STYLED WHEELS AND METHOD AND APPARATUS FOR MOLDING THE SAME

[75] Inventors: Robert J. Stalter, Sr., Bowling Green; A. Prueter, Perrysburg, both of Ohio

[73] Assignee: Motor Wheel Corporation, Lansing, Mich.

[21] Appl. No.: 584,810

[22] Filed: Sep. 19, 1990

Related U.S. Application Data

[62] Division of Ser. No. 285,634, Dec. 16, 1988, Pat. No. 4,963,083.

[51] Int. Cl.⁵ ................................................ B60B 7/00
[52] U.S. Cl. ................................... 301/37 P; 301/37 R
[58] Field of Search ............................. 301/37 R, 37 P

[56] References Cited

U.S. PATENT DOCUMENTS

| 4,659,148 | 4/1987 | Grill | 301/37 R X |
| 4,682,820 | 7/1987 | Stalter | 301/37 P |

Primary Examiner—Russell D. Stormer
Attorney, Agent, or Firm—Barnes, Kisselle, Raisch, Choate, Whittemore & Hulbert

[57] ABSTRACT

An improved composite metal-elastomer styled automotive-type wheel with a three-dimensionally contoured ornamental outboard face formed by a plastic overlay body permanently adhered or affixed to the outboard face, and an improved molding apparatus and method for constructing such a wheel. A plastic overlay body has an annular row of outboard pockets disposed in radially offset, axially overlapping relation with a annular row of inboard pockets which in turn register with vent openings in the disc to thereby provide air passages through the wheel for brake ventilation. The outboard pockets preferably are disposed radially remote from the center of the wheel close to the wheel rim, and a relatively thin cross-section of plastic material is molded so as to overlie the outboard rim flange to provide a full-face appearance to the wheel. In the method and apparatus of the invention the mold cavity is provided with perimeter air vents to enable thin cross-section molding adjacent the outer perimeter of the mold cavity.

4 Claims, 5 Drawing Sheets

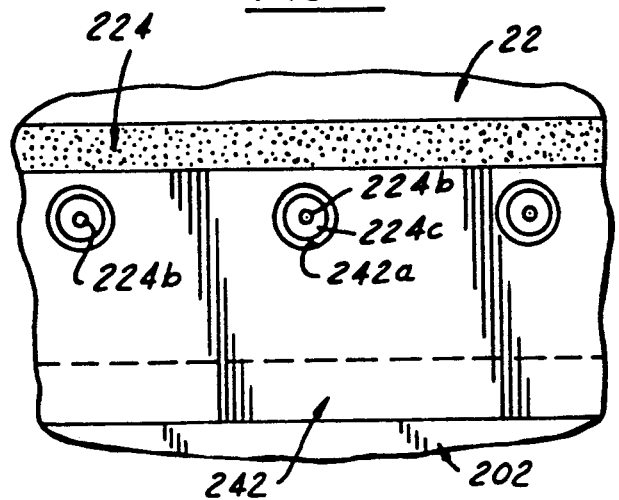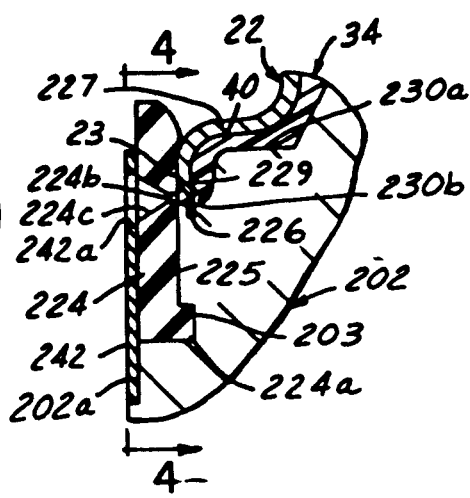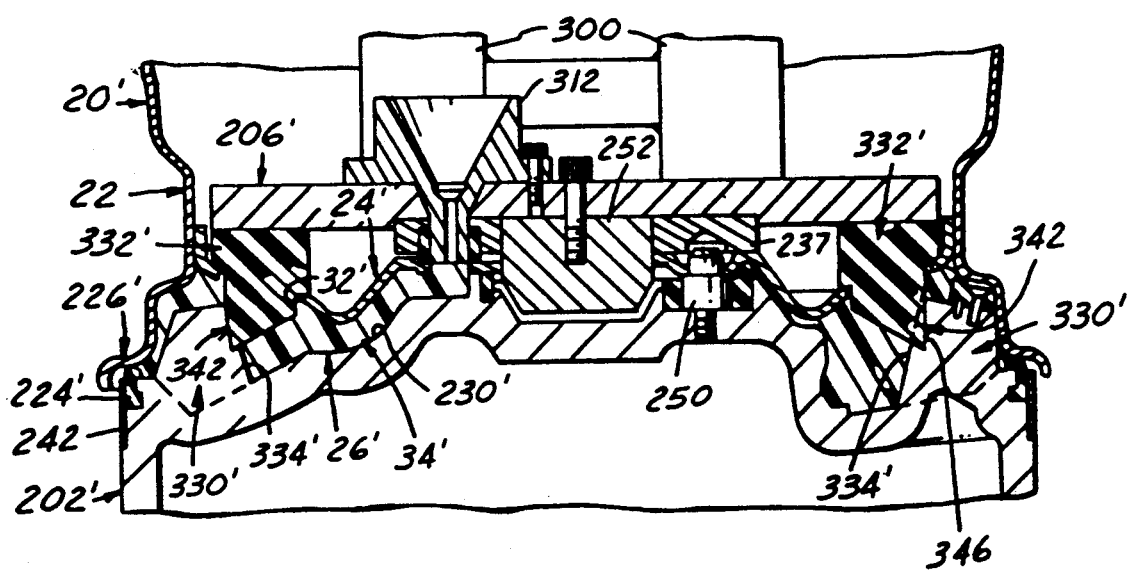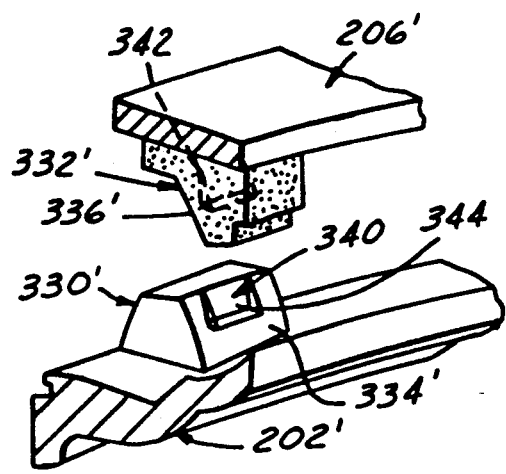

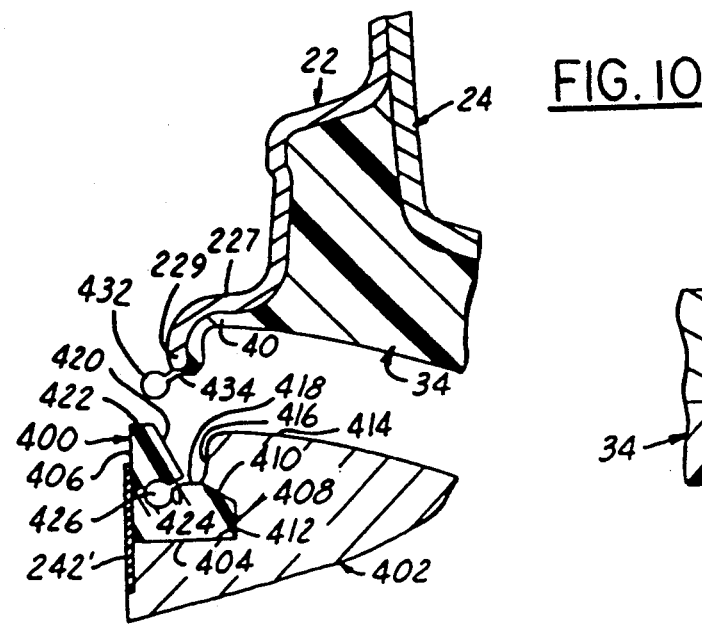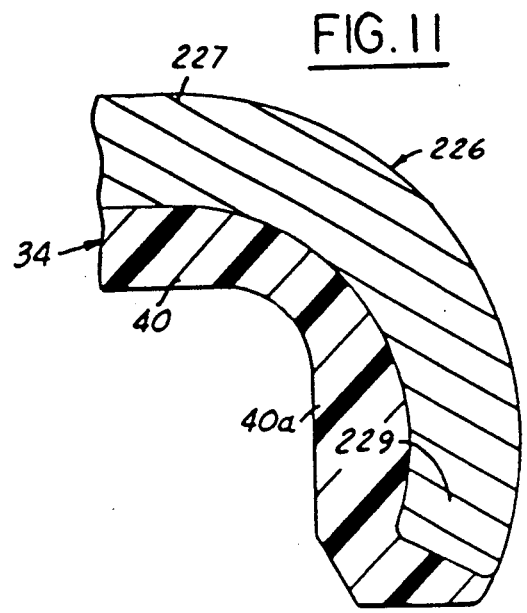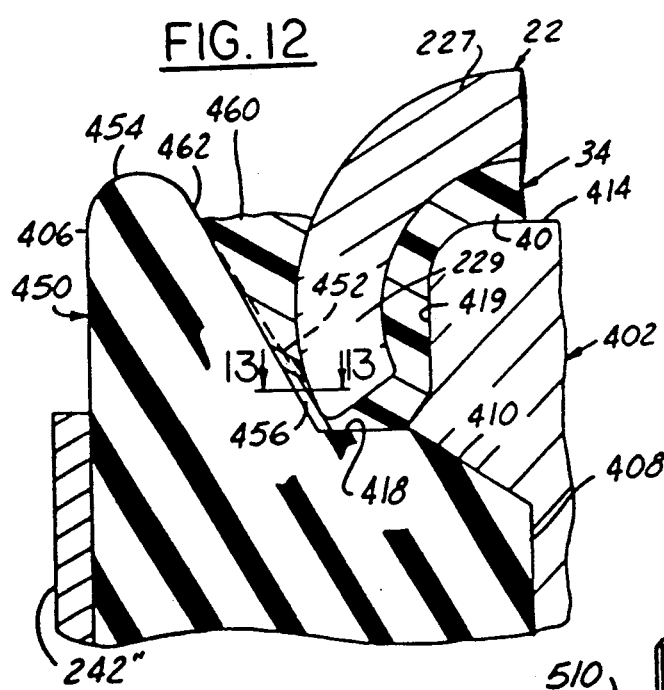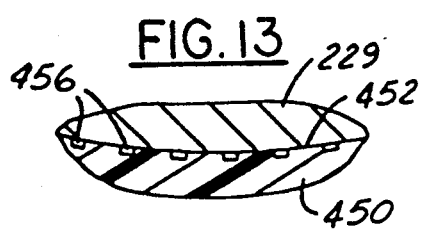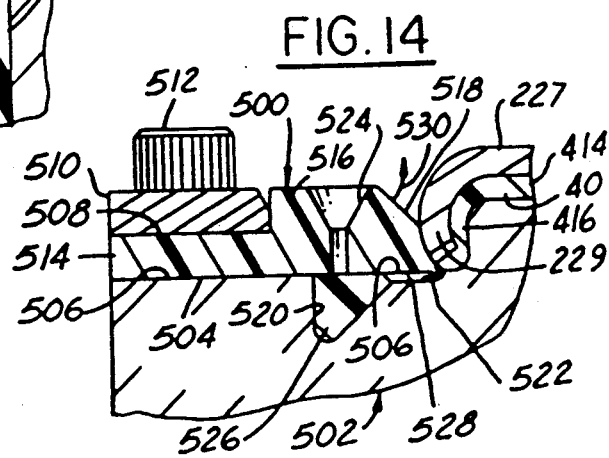

COMPOSITE METAL-ELASTOMER STYLED WHEELS AND METHOD AND APPARATUS FOR MOLDING THE SAME

This is a divisional of co-pending application Ser. No. 07/285,634 filed on Dec. 16, 1988 now U.S. Pat. No. 4,963,083.

FIELD OF THE INVENTION

This invention relates to vehicle wheels of the composite metal-elastomer styled automotive-type with a three-dimensionally contoured ornamental outboard face, and more particularly to molding apparatus and method for constructing such a wheel, and the improved wheel made by such method and apparatus.

BACKGROUND OF THE INVENTION

In the early 1970's Motor Wheel Corporation of Lansing, Mich., assignee of applicant herein, as well as its then parent company, The Goodyear Tire & Rubber Company of Akron, Ohio, developed and introduced an improved form of composite metal-elastomer styled wheel marketed under the registered trademark "POLYCAST". Such styled wheels provided an automotive type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard steel backbone by a permanently adhered ornamental plastic body, either molded separately or in-situ as a homogeneous one-piece body, or in the form of a plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible in the previous deep drawn styled all-steel wheels. The serious problems of loss and theft of removable wheel covers were also eliminated.

Various embodiments of such "POLYCAST" wheels, as well as methods and apparatus for producing the same, are set forth in the following United States Patents and pending patent applications assigned to the assignee herein, which are incorporated herein by reference:

| U.S. Pat. No. 3,669,501 | 6/1972 | Derleth |
| --- | --- | --- |
| U.S. Pat. No. 3,756,658 | 9/1973 | Adams |
| U.S. Pat. No. 3,762,677 | 10/1973 | Adams |
| U.S. Pat. No. 3,815,200 | 6/1974 | Adams |
| U.S. Pat. No. 3,918,762 | 11/1975 | Hampshire |
| U.S. Pat. No. 3,794,529 | 2/1974 | Thompson |
| U.S. Pat. No. 3,935,291 | 1/1976 | Jackson |
| U.S. Pat. No. 3,956,451 | 5/1976 | Adams |
| U.S. Pat. No. 4,398,770 | 8/1983 | Smith |
| U.S. Pat. No. 4,659,148 | 4/1987 | Grill |
| U.S. Pat. No. 4,682,820 | 7/1987 | Stalter |
| U.S. Pat. No. 4,786,027 | 11/1988 | Stalter |
| U.S. Pat. No. 4,290,605 | 12/1988 | Stalter |
| U.S. Pat. No. 4,847,030 | 7/1989 | Stalter |
| U.S. Pat. No. 4,861,538 | 8/1989 | Stalter |

Other prior art patents issued to unrelated parties and directed to various facets of such styled composite metal and plastic wheels include U.S. Pat. Nos. 3,823,982 and 3,998,494 as well as British Patent 1,290,946 (1972).

In one embodiment of the manufacture of such POLYCAST wheels, a portion of the mold comprises a conventional metal vehicle wheel having a drop center rim secured to a central disc or body having the usual bolt circle holes and a central aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in-situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density non-cellular elastomer body which permanently adheres to the outboard surface of the wheel subassembly. The plastic overlay may also be molded from a lower density microcellular closed cell urethane elastomer adhesive material, or a separate decorative cover may be pre-formed and permanent adhesively adhered to the steel wheel subassembly. If the urethane material embodiment is employed, the urethane is allowed to solidify in the mold cavity and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

Current styling trends for automotive passenger car wheels have moved in the direction of a so-called "full-face" appearance for the outboard side of the wheel, in which the outboard face appears to have a disc or body which extends from the center of the outboard face radially all the way out to the rim retaining flange for the outboard tire bead. Current styling is also trending toward moving the wheel vent windows or openings radially outward closer to the outer perimeter of the outboard face of the wheel. Such styles can be achieved without much difficulty by using removable wheel covers while still preserving functional vent windows for circulation through the outboard face of the wheel. Such styling can also be achieved in a styled "all steel" wheel pursuant to the teachings of U.S. Pat. No. 4,610,482, issued Sept. 9, 1986, in the names of Overbeck, Lawrence and Golata, assigned to the assignee of record herein.

Moreover, within given limits, such "full-face" styling can also be achieved in the aforementioned prior art "POLYCAST" wheels, as shown for example in the embodiment of FIG. 9 of the aforementioned Adams U.S. Patent No. 3,762,677. However, this has required the use of a relatively thick cross-section in the outer peripheral portion of the urethane body covering the radially inner face of the rim and extending up to the outboard tire-bead-retaining flange of the rim, due to inherent limitations in the injection pouring, molding and de-molding of the urethane reaction mixture. This heavy or large thickness dimension of the urethane material at the outboard tire bead retaining flange of the rim in turn required specialized wheel weights, which also added to the cost and complexity of the wheel. On the other hand, if the urethane material were terminated short of the outboard tire bead retaining flange of the rim to provide a so-called "modified full-face" look so that standard wheel weights could be attached thereto in the usual manner, a separate trim ring was needed to complete the "full-face" styling effect. These compromises also added to the cost and complexity of the complete wheel. An example of use of such a trim ring and "POLYCAST" construction is shown in the Spisak U.S. Pat. No. 3,891,276.

It has also been difficult if not impossible to achieve a placement of wheel vent windows in the outboard face of the urethane body of the "POLYCAST" wheel disposed radially outwardly close to the outboard tire bead retaining flange of the wheel. This is particularly true if a large number of small vent openings and/or extreme shape effects were desired for styling purposes, such as in simulating certain "scoop-spoke" effects, due to the negative draft angles and other imitations involved in the urethane "POLYCAST" molding process and apparatus. Thus the practice hitherto in making vent windows in "POLYCAST" wheels has been to have the mold vent fingers (such as bosses 46 and/or pedestal portions 294 of the aforementioned U.S. Pat. No. 3,762,677) protrude upwardly from a lower mold part so as to penetrate the "windows" in the steel backbone or disc of the metal portion of the wheel to provide a brake ventilation air passage which extends completely through the wheel.

OBJECTS OF THE INVENTION

Accordingly, it is an object of the present invention to provide an improved wheel construction and method of making the same, in which a "full-face" styling of the urethane body in the aforementioned "POLYCAST" type wheel construction is obtained which is compatible with the use of standard wheel weights, does not require a trim ring and/or can be provided with a plurality of relatively small, highly styled vent openings located close to the outer perimeter of the outboard face of the wheel, while still achieving full flow-through air ventilation in the wheel.

Another object is to provide an improved mold apparatus for practicing the aforementioned improved method of the invention, which is economical in construction and reliable in operation.

A further object is to provide an improved method and apparatus for making the aforementioned wheel construction which achieves the aforementioned objects and yet requires minimum changes in the prior method and apparatus for making prior art wheels of this type.

The present invention, together with additional objects as well as features and advantages thereof, will become apparent from the following detailed description and the appended claims taken in conjunction with the accompanying drawings, which are to scale, wherein:

BRIEF DESCRIPTION OF THE DRAWINGS

FIG. 3 is a fragmentary, enlarged cross-sectional view of the portion of FIG. 2 indicated in the oval "III" in FIG. 2;

FIG. 4 is a fragmentary elevational view of the portion of the outer perimeter seal as shown in FIGS. 2 and 3, and as viewed in the direction of the arrows of the view line 4—4 of FIG. 3;

FIG. 5 is a vertical cross-sectional view, similar to the cross-sectional view of FIG. 2 and taken in part on the line 5—5 of FIG. 7, but also showing a second embodiment of the upper and lower mold parts juxtaposed in assembly to the disc and rim subassembly and provided with a second embodiment of a split core mold construction of the present invention;

FIG. 6 is an exploded fragmentary perspective view of a portion of the split core construction of the embodiment of FIG. 5.

FIG. 10 is a fragmentary vertical sectional view similar to that of FIG. 9, but slightly enlarged thereover, and showing the steel disc and rim wheel subassembly with the decorative ornamental overlay body adhered thereto separated vertically from the lower mold part during the de-molding operation.

FIG. 11 is a fragmentary, greatly enlarged view of the outboard tire bead retaining flange of the wheel rim with the ornamental urethane body material adhered thereto after completion of a final trim operation.

FIG. 12 is a enlarged fragmentary vertical cross sectional view of a third perimeter vent seal construction of the invention after completion of the mold filling operation.

FIG. 13 is a fragmentary horizontal sectional view taken on the line 13—13 of FIG. 12.

FIG. 14 is a fragmentary vertical cross sectional view illustrating a fourth embodiment of the vent seal construction of the present invention.

DETAILED DESCRIPTION OF THE PREFERRED EMBODIMENT

Figures 1, 2:
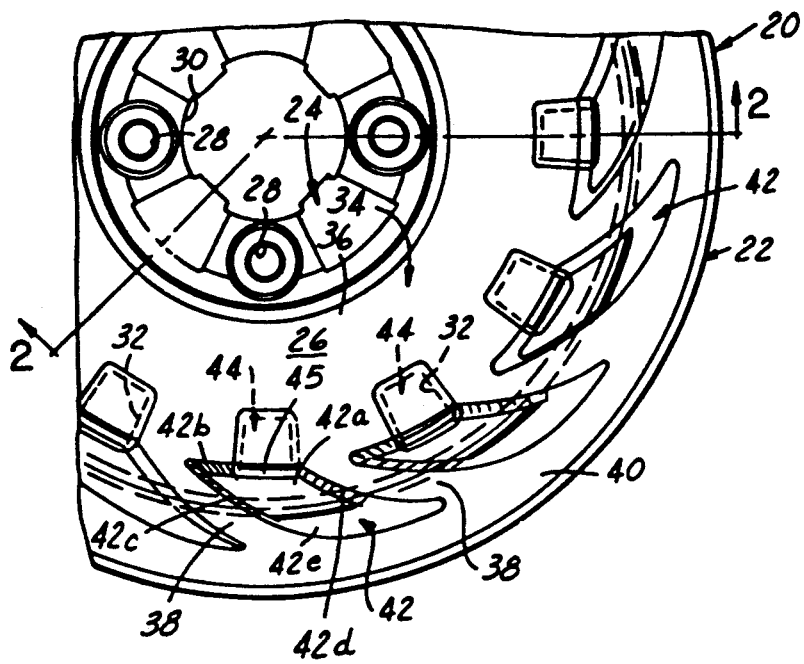
FIG. 1 is a fragmentary vertical elevational view of the outboard face of a composite steel and plastic wheel construction made in accordance with one embodiment of the present invention.
FIG. 2 is a vertical cross-sectional view taken on the line 2—2 of FIG. 1 but also showing the upper and lower mold parts of the apparatus of the invention juxtaposed in assembly to the disc and rim subassembly and provided with a first embodiment of a split core and wheel perimeter seal mold construction of the present invention.

Referring in more detail to the accompanying drawings, FIGS. 1 through 4 illustrate a first embodiment of improved apparatus for practicing the improved method of constructing a composite metal-elastomer styled wheel of the aforementioned "POLYCAST" type in accordance with an improved wheel construction, all of the present invention. The wheel is generally designated at 20 and comprises, by way of a preferred example, a conventional drop center steel rim 22, a central steel disc or body 24 permanently secured, as by welding, to the rim, prior to the molding operation. Wheel 20 also includes an ornamental three-dimensional contoured overlay, generally designated at 26 (FIGS. 1 and 2), permanently adhesively secured to the outboard face of disc 24 and to the outboard, radially inwardly facing, surface of rim 22. Disc 24 is provided with a circle of bolt holes 28 and a central wheel spindle aperture 30 so that wheel 20 can be removably attached to a wheel hub and associated disc brake or drum brake assembly. For decorative purposes and for brake ventilation, a plurality of cut-outs or vent holes 32 are provided in disc 24 (only five of a circular array of 12 such holes being shown in FIG. 1). The particular configuration of the steel components of wheel 20, including rim 22 and disc 24, may follow solely utilitarian considerations such as strength of the wheel and ease and economy of manufacture, since the asthetic appearance of the wheel is determined largely by the three-dimensional contour of the ornamental overlay 26. The three dimensional contours of overlay 26 in turn are determined by the particular ornamental or asthetic appearance desired by the designer of wheel 20.

In the ornamental exemplary design of FIGS. 1 and 2, overlay 26 has a mid-radial annular section 34 with a generally smooth, slightly convex outer face 36, and a plurality of curved scoop fins 38 which radiate in a swept-back fashion outwardly from section 34 to an outer annular peripheral portion 40. Outboard scoop pockets 42 are provided between each adjacent pair of fins 38 and pockets 42 extend axially inboard, in radially offset, axial overlapping relation, to individually associated inboard pockets 44, each of which communicates with an associated disc aperture 32. Section 34 of overlay 26 has an internal, slightly frusto-conical wall 50 diverging outboard axially of the wheel and terminating at an axially inset hub cap seating surface 52. Wall 50 defines a relatively large cavity in the center of overlay 26 and is adapted to receive the vehicle wheel spindle therein in a mounted condition of wheel 20.

FIGS. 2–4 also illustrate an improved molding apparatus, and improved method of making wheel 20 utilizing such apparatus, in accordance with the invention, which incorporate many of the features of the molding apparatus and method illustrated in conjunction with FIGS. 7 through 11 of the aforementioned Adams U.S. Pat. No. 3,762,677, which is incorporated herein by reference. Likewise, the molding apparatus or mold 200 described in columns 11–16 of the '677 patent is incorporated herein by reference, and identical reference numerals are employed in FIGS. 2 and 3 to identify elements alike in structure and/or function.

Mold apparatus 200 thus comprises the three main components: namely, (1) a lower mold part 202 (FIG. 2); (2) the metal wheel subassembly 22-24; and (3) an upper mold half 206 which serves as a backup support for clamping wheel 22-24 onto mold part 202. In accordance with one feature of the present invention, to be described in more detail hereinafter, lower mold part 202 has an annular lip in the form of a circumferentially continuous, specially vented resilient seal 224 against which seats an annular portion of the radially outwardly facing surface 23 of the outboard, tire-bead-retaining flange 226 of rim 22 (FIG. 3). Mold part 202 also has a surface 230 on its upper side radially inwardly of seal 224 adapted to define, with the outboard face of wheel subassembly 22-24, a mold cavity in which the decorative plastic overlay 26 is cast, the same being suitably contoured to provide the ornamental configuration to form the outboard decorative face 36, 38, 40 of wheel 20.

To assemble mold 200, wheel subassembly 22-24 is placed against lower part 202 as shown in FIG. 2 with the outboard tire bead-retaining flange 226 of rim 22 resting on or in light contact with seal 224. This also lightly seats the bolt circle portion 214 of disc 24 against an annular inner seal 234 mounted on the upper face of a mold pedestal 235 which in turn is seated on the center of face 230 of mold part 202 and removably secured thereto by a stud 233. Pedestal 235 provides a core to form the wall 50 defining the wheel well cavity in the center of overlay 26. Seal 234 is adapted to seal the mold cavity around its inboard inner perimeter in the fully seated condition of wheel subassembly 22-24 on mold part 202.

Mold part 206 has a resilient annular pad 236 having a configuration on its underside adapted to seat against the inboard face of disc 24 in overlying and surrounding relation to disc vents 32 to thereby force the disc-rim subassembly 22-24 further toward part 202 and then retain parts 202 and 22-24 in sealing engagement. A steel funnel 312 is secured by bolts 313 onto the upper surface of clamp plate 244 and has a coaxial neck 314 which extends downwardly through a washer seal 316 disposed within seal 237. Disc 22 is provided with a pour opening 290 between a pair of adjacent bolt holes 28 therein. Neck 314 of funnel 312 and washer seal 316 are positioned for coaxial registry with pour opening 290, and the lower face of seal 316 seats in sealed relation on the inboard face of disc 22 around the margin of opening 290. Pedestal 235 has a notch 288 (indicated in phantom by dash lines in FIG. 1) in its upper surface which registers with pour opening 290 and funnel neck 314 to serve as a sprue for directing the liquid urethane reaction mixture into the mold cavity during pouring of the mold.

Lower mold part 202 has a locating pin 250 (not seen in FIG. 2, but shown in the second embodiment mold of FIG. 5) affixed to and protruding upwardly from pedestal 235 parallel to the wheel axis which protrudes through an associated one of the disc bolt holes 28 in the closed condition of the mold for angularly locating the rim-disc subassembly 22-24 accurately on the lower mold part 202. Upper mold part 206 has a central locating core 252 projecting through the disc center opening 30 and into the space below disc 24, core 252 having a close clearance fit with disc center hole 30 to thereby center the metal wheel subassembly 22-24 relative to the upper mold part 206 in the closed condition of the mold 200.

Funnel 312 has a conical throat portion 320 downwardly convergent and communicating with a coaxial cylindrical neck passage 322 which opens at the lower end face of neck 314. Although unrestricted communication of passage 322 via a circular disc opening with the sprue notch passage 288 in pedestal 235 may be employed pursuant to U.S. Pat. No. 3,762,677, and as shown in FIGS. 2 and 5, it is preferred to employ a predetermined annular orifice in the form of a sprue pin interposed in disc pour opening 290, as disclosed in more·detail and claimed in co-pending U.S. patent application Ser. No. 015,165 filed Feb. 17, 1987 and assigned to the assignee of record herein, also incorporated herein by reference. These sprue pins are selected to define an annular passenger of the same cross-sectional area normally provided with the prior open circle pour opening in the disc. However, as contrasted to such prior circular pour hole, these annular orifices have a small radial dimension between their inner and outer concentric surfaces. Hence, once the mold cavity becomes substantially filled, and the urethane reaction mixture starts to cure such that gelation takes place, the solidifying particles of urethane tend to block reverse flow through these narrower annular orifices to thereby prevent reverse flow and escape of the urethane from the mold cavity. Hence the sprue pin of the aforesaid co-pending application helps overcome the previous "blow-back" problem of a circular pore opening.

In accordance with one feature of the present invention, which is illustrated in the first embodiment of FIGS. 1 through 4, the molded urethane elastomer decorative body 34 covers the full outboard face of wheel 20 to impart a "full face" appearance to the finished wheel 20. However, unlike the "full face" "POLYCAST" wheel construction illustrated in FIG. 9 of U.S. Pat. No. 3,762,677, wherein the urethane cross-sectional thickness in the area adjacent the rim 22 has a relatively large cross-sectional thickness in order to prevent mold bubble defects, in the present invention a relatively thin cross-sectional thickness of the urethane material is provided in the extreme outer periphery of body 34 where the same is directly adjacent to the radially extending portion 227 and the reversely curled portion 229 of the outboard rim flange 226, as best seen in FIG. 3. In order to provide this thin cross-section at the outer perimeter of body 34, the outer perimeter surfaces of the mold face 230 of the lower mold part 200 are contoured as shown in FIG. 3 to provide a radially extending and circumferentially continuous mold face 230a spaced closely adjacent rim flange portion 227. Surface 230a merges with an axially extending and circumferentially continuous mold surface 230b which curls around the outboard free edge of flange 226 and terminates at the inner periphery 225 of seal 224.

Seal 224 is a circumferentially continuous band of elastomeric material, such as silicone rubber, which seats snugly in an outer peripheral groove 203 of mold part 202 and is anchored against axial movement by a leg 224a which seats in an offset portion of groove 203. Seal 224 is securely held in place on lower mold part 202 by a steel retainer band 242 which encircles the outer periphery of seal 224 and seats in a shoulder 202a of mold part 202. Band 242 is a split band having suitable adjustable tensioning mechanism, such as an overcenter toggle lock (not shown), so that the gripping tension of retainer 242 can be varied as needed for various mold set-ups and molding pressures. Preferably, the retainer band 242 is adjusted loose enough to allow positioning of the wheel in the mold and removal after molding, but with sufficient tension to prevent unwanted foam leakage.

In accordance with the present invention, trapped air defects commonly encountered in thin section urethane reaction mixture molding are avoided by the provision of a plurality of air vent passages 224b extending radially through seal 224 from the inner periphery thereof communicating with the space between lower mold surface 230b and rim flange outer edge 229 (FIG. 3). Each passage 224b has a relatively small diameter and short axial length, and opens into a conical mouth 224c which in turn opens to the outer periphery of seal 224, vents 224b -224c thus being funnel shaped. Retainer 242 is provided with a series of circular holes 242a which register with, and are slightly larger in diameter than, the mouth of vent opening 224c. The seal vents 224b -224c and registering band holes 242a are equally circumferentially spaced around the perimeter of seal 224.

The diameter and axial length of the vent apertures 224b are predetermined to readily vent entrapped air being pushed out of the space between the mold and rim flange as the liquid urethane reaction mixture is driven into the space under pressure from the injection nozzle 312. However, these air vent dimensions are sufficiently small to provide an orifice which restricts flow of liquid urethane through seal 224. Preferably, these restricted orifices are sized to cooperate with cure and molding cycle times, such that gelation will occur in the urethane reaction mixture in the mouth 224c to first restrict and then dam the flow of urethane as the mold cavity has been completely filled and initial curing takes place to form the elastomeric body 34.

After cure has been completed to the point of allowing opening of the mold, and while the urethane reaction mixture is still soft, the upper mold clamp 206 is lifted off of wheel subassembly 20. Then wheel 20 with body 34 permanently adhered thereto is removed from the lower mold part 202. During this opening or mold stripping operation, the thin flash pip of urethane residue in the seal vent 224b -224c will be severed from urethane body portion 40 at the interface between the inner periphery of seal 224 and portion 40. After the mold has been cleared, it is a easy matter to punch out the residual flash urethane from the seal vents 224b -224c by forcing it radially outwardly of the vents to thereby prep the mold for the next molding cycle.

The resultant thin cross-section of urethane material 40 adhered to the outboard face of the rim flange, following as it does the curl of the bead flange, permits the use of standard wheel balance weights such as those currently used with cast aluminum wheels. That is, referring to FIG. 11, illustrative of one working example as set forth hereinafter, the combined thickness, taken in a direction radially of the wheel 20, of the rim flange edge 229 and the radially inwardly adjacent portion 40a of body 34 may be 5.7 millimeters. This combined dimension is generally the same as that of the radial thickness of the wheel flange of conventional present day aluminum wheels. Hence, the body of the "POLYCAST" urethane ornamental overlay can be molded to the extreme edge of the bead flange to provide a nice appearance and to create the illusion of a larger diameter wheel, while still allowing the use of standard, readily available wheel balance weights.

In one working example of a wheel 20 constructed in accordance with the present invention, the following parameters and specifications were observed to successfully achieve the objects of the inventions:

| Parameters | Values |
| --- | --- |
| Wheel Diameter | 14" |
| Rim Flange Height (beadseat to beadseat axially of rim) | 5.5" |
| Thickness of Rim Flange 226 | 3 mm |
| Average Thickness of Portion 40 of Overlay 34 | 2¼-3¼ mm |
| Urethane Reaction Mixture Injection Pressure Entering the Cavity of Mold 202-24 (Approximate) | 2000 PSI |
| Time from Start of Injection to Mold Separation | Approx. 5 min. |
| Molding Temperature | 140° F. |
| Urethane Reaction Mixture Specification: see U.S. Pat. No. 3,762,677 | Approx. |
| Radial Thickness of Seal 224 | 7 mm |
| Number of Vent Openings 224b | 26 |
| Diameter of Vent Opening 224b | 1 mm |
| Axial Length of Vent Opening 224b | 2 mm |
| Axial Length of Vent Throat 224c | 5 mm |
| Mouth Diameter of Vent Throat 224c | 5 mm |

In accordance with another feature of the present invention, wheel 20 is provided with a large number (12, for example) of highly styled scoop-shaped pockets 42 disposed closely adjacent the outer periphery of the outboard face of the wheel. Although pockets 42 appear to the casual observer to be "blind" openings, they are in fact part of the brake ventilation air flow passages which extend all the way through the urethane overlay 34 and steel disc 24 of wheel 20.

Thus, referring to FIG. 1 as well as FIG. 2, each outboard pocket 42 has a generally radially extending "blind" bottom wall 42a which slants slightly outboard in a radially outward direction, and a radially inward side wall 42b extending from bottom wall 42a axially to the outboard face of portion 36 of the decorative overlay 26, wall 42b sloping slightly radially inwardly in an outboard direction. Pocket 42 also has leading and trailing mutually divergent side walls 42c and 42d extending out to face 36, and is completed by a radially outermost wall 42b mutually divergent from wall 42b and sloping radially outwardly in an outboard direction.

Each outboard pocket 42 communicates with an inboard pocket 44 formed in overlay 26 in registry with disc opening 32 and extending in outboard direction axially of wheel 20 in radially inwardly offset and axially overlapping relationship to the associated outboard pocket 42. Pocket 44 may be generally rectangular in cross-section and terminates at its outboard end in a wall 44a which slopes radially outwardly in an outboard direction to a junction with pocket wall 42b. Inboard pocket 44 also has a radially outermost wall 44b which extends from disc opening 32 axially in an outboard direction to a junction with pocket wall 42a. A relatively large opening 45 (FIG. 1) is thus defined between the junctions of walls 42b and 44a and the junction of wall 42a and 44b to thereby provide air flow communication between pockets 42 and 44. However, despite the openings 45 the inboard pockets 44, being offset radially inwardly from the outboard pockets 42, are essentially invisible from the outboard side of wheel 20.

In accordance with another feature of the present invention, the mold apparatus is provided with a "split core" construction adapted to produce the aforementioned radially off-set but communicating outboard and inboard pockets 42 and 44. In the embodiments of FIGS. 1-4, the split core construction comprises a series of outboard pocket cores 330 which project upwardly from the lower mold part 202 at the appropriate locations on mold face 230 to form outboard pockets 42 in the overlay 34. The configuration of cores 330 is complimentary to the aforementioned walls 42a, 42b, 42c, 42d and 42e of the outboard scoop pockets 42, which as will be seen from FIGS. 1 and 2 provides quite adequate draft angles for mold stripping from cores 330.

Upper mold part 206 likewise has a plurality of inboard pocket cores 332, one for each of the inboard pockets 44, which are affixed to the underside of plate 244 and protrude downwardly therefrom as viewed from FIG. 2 (axially of wheel 20). Each inboard core 332 has a cross-sectional configuration complimentary to the vent openings 32 and adapted to fit therethrough with a close sliding fit. Cores 332 also individually fit through complimentary openings in the annular seal 236 so that the clearance between cores 332 and the associated disc hole 32 is sealed when mold part 206 is fully clamped in the closed mold condition. Each core 330 has a radially-inwardly-facing sloping surface 334 which defines a mold cavity wall to form outboard pocket wall 42b. Likewise, each core 332 has a radially outwardly facing surface 336 adapted in the closed mold condition to define a mold cavity surface which either abuts or is disposed with a very slight clearance from core surface 334. The remaining end surface and four side surfaces of core 332 define the inboard pocket walls 44a, 44b, etc.

Due to the touching or juxtaposed close spacing of surfaces 334 and 336 in the closed condition of the mold, a more or less thin urethane film exists at the mating area of the upper and lower cores 332 and 330 due to the allowance accorded for normal manufacturing tolerances in the mold apparatus. This thin film of urethane material exists in the area of what is to become window 45, and is removed in a deflashing operation after the finished wheel is removed from the mold. Upon such removal the opening 45 is obtained, thus providing the air flow passage through the wheel via each pair of registering inboard and outboard pockets 44 and 42 and interconnecting window 45. It will be noted that the inboard pocket cores 332 have wide draft angles on their end faces and can be provided with slight draft angles on their side surfaces to facilitate stripping upper mold clamp 206 upwardly off of disc 32 during the mold opening operation.

It thus will be seen that with the mold apparatus of the present invention, the wheel vent pockets 42 visible from the outboard face of the wheel may be moved close to the outer perimeter of the wheel while still having functional vent windows for air flow through the wheel for brake ventilation purposes. Moreover, the split core mold construction enables a designer to achieve a wide variety of styling in the outboard pockets 42, including making these pockets relatively small in cross-sectional area and closely spaced if desired, whereby the design versatility in making "POLY-CAST" wheels can match that available in removable wheel covers in order to follow current styling trends.

Figure 7:
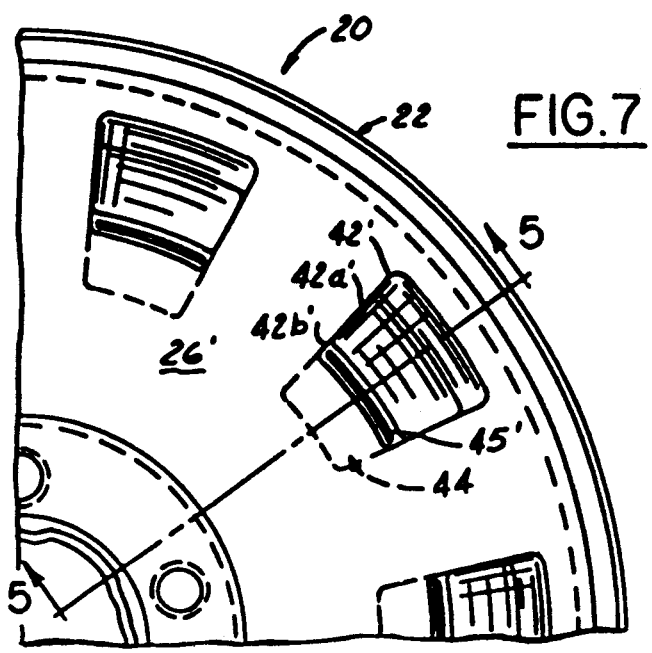
FIG. 7 is a fragmentary vertical elevational view of the outboard face of a composite steel and plastic wheel construction made in accordance with the second embodiment of the present invention.

Referring to the second embodiment of the wheel construction and method and apparatus for making the same as shown in FIGS. 5, 6 and 7, elements which are identical to those described in conjunction with the first embodiment are given the same reference numerals and elements which correspond in functional similarity are given the same reference numeral raised by a prime suffix. In this embodiment, the modified "POLYCAST" wheel construction 20' is seen in FIG. 7 as a decorative urethane overlay 26' permanently adhered to the outboard face of a wheel disc 24', and an annular row of circumferentially spaced outboard vent pockets 42' which communicate via an opening 45' in their radially innermost wall with individually associated, radially inwardly offset inboard vent pockets 44'. Again, outboard opening pockets 42' are disposed closely adjacent the outer perimeter of the wheel, and each pair of the associated outboard and inboard pockets 42' and 44' provide for air flow passage from the outboard to the inboard sides of the wheel, and vice versa, for brake ventilation.

In the modified mold apparatus of FIGS. 5 and 6 of the second embodiment, the lower mold part 202' employs the retainer band 242 of the aforementioned U.S. Pat. No. 3,762,677, and a non-vented resilient seal 224' adapted to seat against the corner of the outboard tire bead retaining flange 226' of wheel rim 22 in a manner similar to the seal 38 of the aforelisted U.S. Pat. No. 4,251,476 or seal 16 of the aforelisted U.S. Pat. No. 4,017,239. The second embodiment, insofar as the seal construction is concerned, thus follows the aforementioned prior art when it is desired to construct a "POLYCAST" wheel having an outboard configuration less than "full-face". However, it is to be understood that the vented seal construction of the first embodiment may be employed when using the mold apparatus of the second embodiment if a "full-face" effect is desired.

Other than the perimeter seal construction, the principal difference between the first and second embodiment resides in the construction of the lower mold outboard pocket cores 330' and upper part 206' inboard pocket cores 332'. In those applications where it is desired to accommodate dimensional variations in the steel backbone or disc 24' from wheel to wheel as the same are repetitively fixtured onto the constant dimension lower mold part 202', it may be necessary to permit the upper mold part 206' to "float" to accommodate such variations in the steel backbone. Otherwise, metal-to-metal mating of the previously described outboard and inboard pocket cores 330 and 332 may not be achieved, in which event the film of window urethane will be formed with undue variations in thickness, thereby complicating the production finishing process. In extreme cases, interference fit conditions may occur between the split cores during mold closure which may cause mold hang-up or closure blockage.

Accordingly, in the second embodiment the outboard pocket cores 330' protruding upwardly from a lower mold part 202' are provided with a notch 340 in their radially innermost sloping surface 334', and the inboard pocket cores 332' are provided with a tongue 342 on their radially outwardly facing surface 336' which seats in notch 340 in the closed condition of the mold. The lid cores 332' are made of a suitable flexible material, such as silicone rubber, dimensioned to have, in the closed condition of the mold, a slight squeeze or press fit engagement with lower mold cores 330', the lid cores 332' flexing slightly to accommodate this engagement. The amount of flexure will, of course, depend upon the particularly tolerance variation encountered in any given wheel-to-lower mold placement during mold assembly.

It is to be noted that the radially innermost surface 334' of cores 330' slope radially inwardly in an outboard direction by say 10° or 15° to the axis of wheel 20', and likewise the radially inwardly facing surface 344 (FIG. 6) of notch 340 also slopes radially inwardly in an outboard direction by a lesser amount, say 5° to the axis of the wheel. The complimentary mating surfaces of the lid inboard pocket cores 332', namely 336' which mates against surface 334', and the radially outwardly facing surface 346 of tongue 342, which seats against notch surface 344, are inclined at complimentary angles to their associated juxtaposed surfaces of the outboard cores 330'. These angled surfaces thus have a wedge like engagement which facilitates the squeeze action upon final closure of the mold, as well as facilitating mold separation due to the draft angles provided by these surfaces.

The flexibility of the material of the inboard pocket cores 332' thus accommodates the aforementioned tolerance variations in the wheel disc 24' from wheel to wheel relative to the lower mold part 202', allowing the mold lid 206' to "float" in a lateral plane perpendicular to the axis of the wheel. The tongue and groove engagement provided by tongue 342 in the associated notch 340 insures that core-to-core contact between the inboard and outboard pocket cores 332' and 330' is held during injection of the liquid urethane reaction mixture and during curing after mold pour.

As in the first embodiment, after mold separation a window area 45' (FIG. 7) will be formed in the area where the inboard and outboard pocket cores have mutual engagement in the closed condition of the mold. Windows 45' provide air flow communication between outboard pockets 42' and inboard pockets 44' of the urethane elastomer overlay 26', and through the associated registering disc openings 32', to again provide air flow through the completed wheel for brake ventilation. Due to the press fit flexing contact of inboard pocket cores 332' against the rigid metal or fiberglass outboard pocket cores 330' in the fully closed condition of the mold, entrance of the liquid urethane reaction mixture between these tightly engaged juxtaposed core surfaces will be greatly reduced, if not eliminated, thus greatly reducing or eliminating the deflashing operation required to open the window area to thereby reduce production costs.

Figures 8, 9:
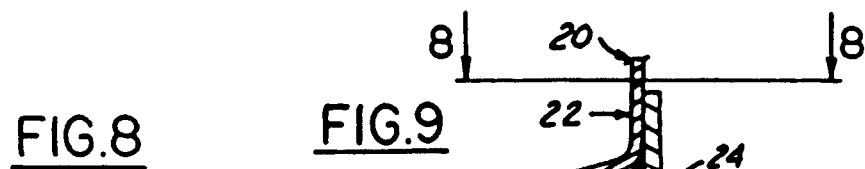
FIG. 8 is a fragmentary vertical elevational and part sectional view taken on the line 8—8 of FIG. 9 of a second embodiment of an outer perimeter seal construction of the invention, showing the steel rim and disc subassembly seated on the lower mold part, as viewed from above looking at the inboard side of the rim and disc subassembly.
FIG. 9 is a fragmentary vertical cross sectional view taken on the line 9—9 of FIG. 8, but with the decorative overlay urethane material also shown after completion of the mold filling operation.

Returning to the first mentioned feature of the present invention, namely imparting a "full-face" appearance to the finished wheel while obtaining a relatively thin cross-sectional thickness of urethane material at the extreme outer periphery of the decorative body, a second embodiment 400 of a vented perimeter mold seal in accordance with the present invention is illustrated in FIGS. 8-10. Seal 400 is provided in place of seal 224 in conjunction with a modified lower mold part 402 for making the full face wheel 20. Seal 400 is a circumferentially continuous band of elastomeric material, such as silicon rubber, and has a generally truncated triangular configuration in radial cross section. Thus, as best seen in FIG. 10, seal 400 has a flat bottom face 404 extending radially of the mold part 402, an axially extending cylindrical outer face 406 and a shorter axially extending inner peripheral face 408 extending between face 404 and a frusto conical face 410. Seal 400 seats snugly in an outer peripheral groove 412 of lower mold part 402 which in turn is contoured to receive the seal surfaces 404, 408, 410. Seal 400 is securely held in place on lower mold part 402 by a modified retainer band 242.

Lower mold part 402 has an upper mold-cavity-defining surface 414 which extends close to the outboard face of rim flange portion 227 (FIG. 9) for forming the thin portion 40 of decorative body 34. Surface 414 blends into an outer peripheral face 416 complimentary to the curl of rim flange edge 229. However, surface force 416 terminates radially inwardly of rim edge 229 where it meets seal surface 410. Seal 400 has a radially extending face 418 which is juxtaposed closely spaced from rim edge 229 in assembly of the mold. Seal 400 also has a frusto conical surface 420 extending axially and radially outwardly from face 418 to a junction with a radial upper end face 422 of seal 400. As best seen in FIG. 9, in the fully seated position of disc and rim subassembly 22-24 onto lower mold part 402, rim flange edge 229 has a wedge-like engagement with the surface 420 of seal 400 so as to yieldably compress the same to seal off the outer perimeter of the mold cavity.

Figure 9A:
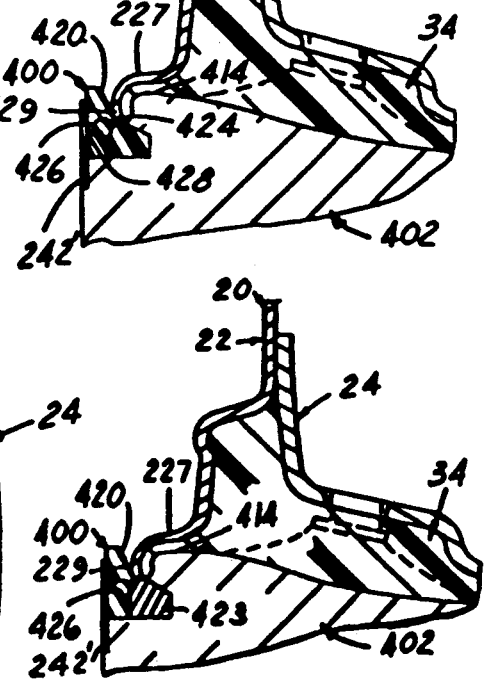
FIG. 9A is a fragmentary vertical cross sectional view similar to FIG. 9 except cut through a rim support block on line 9A—9A of FIG. 8.

FIG. 9A shows that in the fully seated position the rim flange contacts a steel rim support block 423 which assists in positioning the rim relative to mold part 402 and thereby controls the thickness of the urethane decorative section on the rim flange. Preferably, three of such blocks 423 are provided at equally spaced locations around the perimeter of mold part 402 and positioned as shown in FIG. 9A.

In order to vent air from the mold cavity during the mold filling operation, seal 400 has a narrow, continuous slot 424 (FIG. 10) which extends completely around the seal between surfaces 418 and 420. The junction of the vent slot 424 with the mold cavity is preferably located to coincide in the mold-assembled condition with the radially outermost portion of the rim flange edge 229 so that portion 40 of the decorative body extends outwardly over this edge after the molding operation. Slot 424 leads radially outwardly into an annular interior air passage 426 which also extends completely around seal 400. In the illustrative embodiment of seal 400, air passage 426 communicates with a single exterior vent passageway 428 (FIG. 8) in seal 400. Retainer band 242' has only one single large opening 430 which registers with seal vent passageway 428 to thereby provide an air vent to exterior atmosphere from air passageway 426.

In the operation of the apparatus of mold vent seal 400, as the mold cavity is filled by the expanding liquid urethane reaction mixture, air escapes around the entire periphery of the cavity through the slot 424 into the passageway 426, where it is then directed to the single vent hole 428-430 for escape to atmosphere. As the urethane foam continues to expand after the mold cavity is completely filled, sufficient pressure will build up to force the urethane foam through the narrow slot vent 424 and into the air passageway 426. A small amount of foam will eventually be forced out through the exterior vent 428. It is to be noted that both the sizing of the exterior vent 428 and the width of slot 424 are important in controlling the air and foam bleeding process. Optimum results are obtained through emperical try out depending upon the volume and shape of the decorative body 34 being molded to the steel components of the wheel subassembly. However, by way of illustration and not by way of limitation in one working embodiment, the vent 424 has a height dimension in the plane of the drawing of FIG. 9 of 1 millimeter and extends in length from the junction with the mold cavity to the air passageway 426 a distance of 2 millimeters. The diameter of the circular cross section of air passageway 426 is 7 millimeters and its median diameter from the axis of the wheel assembly is 370 millimeters. The diameter of the single atmospheric vent 428 is 1.5 millimeters and its length is 2 millimeters.

After the mold has been filed and the urethane cured sufficiently for demolding the wheel subassembly 22-24 is raised vertically from the lower mold part 402 as illustrated in FIG. 12 where the two ports are shown separated immediately after wheel demolding. It will be noted that the vented urethane foam remains attached as a flashing consisting of the ring 432 connected by a narrow strip 434 to the outer periphery of portion 40. Strip 434 corresponds to the cavity formed by vent 424 and ring 432 to the cavity form by air passageway 426. Due to the resilient nature of seal 400, as the wheel is initially lifted upwardly from lower mold part 402, the force exerted from flash ring 432 entrapped in air passageway 426 will deform the flexible lip portion of the seal, i.e., the section of the seal bounded by vent 424 and surfaces 420, 422, and the unrestrained portion of the outer periphery 406 above passageway 426. The vent passage 424 will thus open up, and the flash 432 will also slightly compress, to thereby permit flash ring 432 to be stripped from the air passage 426 and slot 424 without becoming detached from the metal surface of the rim flange edge 229 or from portion 40 of the decorative body 34. Hence vent seal 400 is essentially self cleaning in the demolding operation, i.e., the operator need only clear the single exterior vent hole 428-430.

After demolding, the cured wheel will then be deflashed with a Vee knife or in an automated water knife trimming operation in a conventional manner. The trimming may leave an edge such as that shown in FIG. 11, referred to previously hereinabove, if desired. Vent seal 400 is thus preferred over the first embodiment vent seal 224 from the standpoint of reduced vent cleaning as well as providing a peripherally continuous vent to the mold cavity space.

Referring to FIGS. 12-13, a third embodiment of a mold venting construction of the invention is illustrated which utilizes a modified seal 450 shaped similar to seal 400 and mounted on lower mold part 402 in the same manner. However, the split, toggle-clamped retainer band may be modified to provide an imperforate band 242" inasmuch as no venting occurs through band 242". Seal 450 also differs from seals 400 and 224 in that it does not have any internal venting cavities or passageways and is completely self-cleaning. The portion of seal 450 between surfaces 418 and 406 is modified to provide an inclined frusto-conical surface 452 which slopes axially and radially outwardly of the wheel axis from a junction with surface 418 out to a rounded peripheral edge 454. Surface 452 preferably is inclined at a 30° angle to the wheel axis and is provided with a series of vent grooves 456 located at equally angularly spaced intervals around surface 452 (FIG. 13). In one working embodiment grooves 452 are located at 2½° intervals, and at the lower terminus of the groove with face 418 the grooves were 0.508 millimeters deep measured parallel to face 418, and about 1.524 millimeters wide in the direction circumferentially of seal 450.

As will be seen in FIG. 12, the outer face of the rim flange edge portion 229 is adapted to compressibly squeeze seal against the radially inner face of surface 452 without thereby closing or squeezing shut grooves 456 as shown in FIG. 13. Wheel rim 22 additionally is supported in any suitable fashion, as by three steel pins or spacer blocks (not shown) fixed onto lower mold surface 412 at 120° intervals (seal 450 being suitably notched to receive these blocks), so that the outer free edge of rim portion 229 closest to face 418 of the seal rests on these blocks and is spaced from surface 418 in the closed condition of the mold by a predetermined distance such as 0.50 millimeters. Thus in one illustrative working embodiment mold seal 450 has approximately 144 grooves 456 to thereby provide a substantially continuous peripheral venting system for the mold cavity.

In the operation of the wheel molding apparatus employing vent seat 450, during the mold filling operation the passages provided by grooves 456 will vent air from the main mold cavity substantially around the entire periphery of the outboard tire bead retaining flange of the rim to permit smooth, uninterrupted flow of the urethane reaction mixture radially outwardly to the rim edge to produce the thin cross section portion 40 without molding defects therein because the cavity air is readily expelled ahead of the expanding urethane via the multiplicity of grooves 456 to atmosphere. As the filling operation is completed and the foam is expanding due to the cure reaction, the excess foam will be forced between seal face 418 and the free edge of the rim flange portion 229 and thence out into the grooves 456, and will finally accumulate as a generally wedge shape ring of flash 460 as shown in FIG. 12. Due to the grooves being open in the direction of mold separation, and also the tapering character of grooves 456, whereby the same merge into the smooth frusto conical surface 462 of seal 450 approximately half way between face 418 and edge 454, the venting grooves are self-cleaning during demolding operation. That is, after the urethane reaction mixture is cured sufficiently to initiate demolding, separation of wheel 20 from the lower mold part 402 (vertically upwardly viewed in FIG. 12) will cause the flash material 460, which has now become adhered to the outer surface of the rim flange portion 229 to cling thereto and strip from the faces 418 and 452, as well as from the side and root walls of grooves 456, with a clean cleavage so that no flash is left on the faces of the seal exposed to the urethane foam during the molding operation. After the demolding operation, the residual flash is again removed from the wheel surfaces such as by suitable knife trimming operations described previously. However, with the embodiment of seal 450 the vent cleaning operation is eliminated from the production cycle.

It is to be understood that the silicone material of seal 450, as well as the prior described seals 400, 224 and 224' tends to facilitate mold release. Nevertheless, if desired, conventional mold release agents may be sprayed on the faces of the perimeter seals exposed to the urethane reaction mixture to facilitate mold separation and flash stripping from the seals.

A fourth embodiment of a vent seal construction of the invention for making a "full face" "POLYCAST" wheel with a thin cross section peripheral portion 40 is illustrated in FIG. 14. In this embodiment a further modified perimeter vent seal 500 is provided in conjunction with a modified lower mold part 502. Seal 500 is again made of a flexible material such as silicone rubber and is generally in the form of an annular ring having a flat bottom face 504 which is adapted to seat upon a flat seating surface 506 provided on lower mold part 502. Seal 500 is notched at 508 to receive a clamping ring 510 which is secured by cap screws 512 to the lower mold part 502 to thereby removably clamp seal 500 onto lower mold part 502. The portion 514 of seal 500 underlying the clamp ring 510 is about half the thickness of the rim-engaging, sealing portion 516 of seal 500. The radially inward periphery of portion 516 has a sloping surface 518 which is adapted to be yieldably and resiliently engaged in compression with the rim flange edge 229 in the mold-closed condition with a predetermined interference fit which may be approximately 0.5 millimeters in a typical application as illustrated herein.

Lower mold part 502 is provided with an annular trench-like passageway 520 which underlies portion 516 of seal 500 radially outwardly of the rim flange edge portion 229. Passageway 520 communicates with the main mold cavity by a series of radially outwardly extending grooves 522 also formed in the upper face of lower mold part 502. Each groove 522 is preferably, in one working embodiment, one millimeter wide and one millimeter deep, and grooves 522 are formed at equally angularly spaced intervals around the periphery of the mold cavity on for example, 5° centers, thus providing in one working embodiment a total of 72 grooves 522.

In the operation of seal embodiment 500, during the mold filling operation the urethane reaction mixture will flow outwardly to first form the thin-cross-section portion 40, and then will continue outwardly beyond the wheel rim edge, with excess foam flowing via grooves 522 into the trench passageway 520. Cavity air is expelled ahead of the advancing foam via passageway 520 through a funnel-shaped atmosphere vent opening 524 provided in portion 516 of seal 500 so as to register with passageway 520. At the completion of the molding operation flash will have filled trench 520 as well as vent 524.

During demolding the flash ring 526 formed in trench 520 will be pulled upwardly with the wheel, the flash ring 526 being integrally joined during curing to urethane portion 40, by the stringers 528 molded in vents 522. This stripping action will cause the portion 516 of seal 500 to flex upwardly in the direction of the arrow 530 as viewed in FIG. 14 with a hinge-like action to thereby release flash ring 526 from the mold as the same is lifted upwardly by and with the wheel. The portion of the flash entrapped in vent 524 will fracture or shear off at the junction of the upper face of ring 526 and the under face 504 of seal 500 during the demolding operation. Seal embodiment 500 is thus self cleaning with respect to lower mold 502 and requires only the one vent opening 524 to be cleaned after each molding operation. The funnel pod formed in vent opening 524 has a geometry which renders the same relative easy to pop-out of the seal after the molding operation. The residual flash element 526 and its attaching fingers 528 is again shaved from the wheel face by a suitable automated knife trimming operation such that the outer periphery of portion 40 may have, if desired, a slightly chamfered surface merging with the outer periphery of rim flange portion 229.

Figure 15:
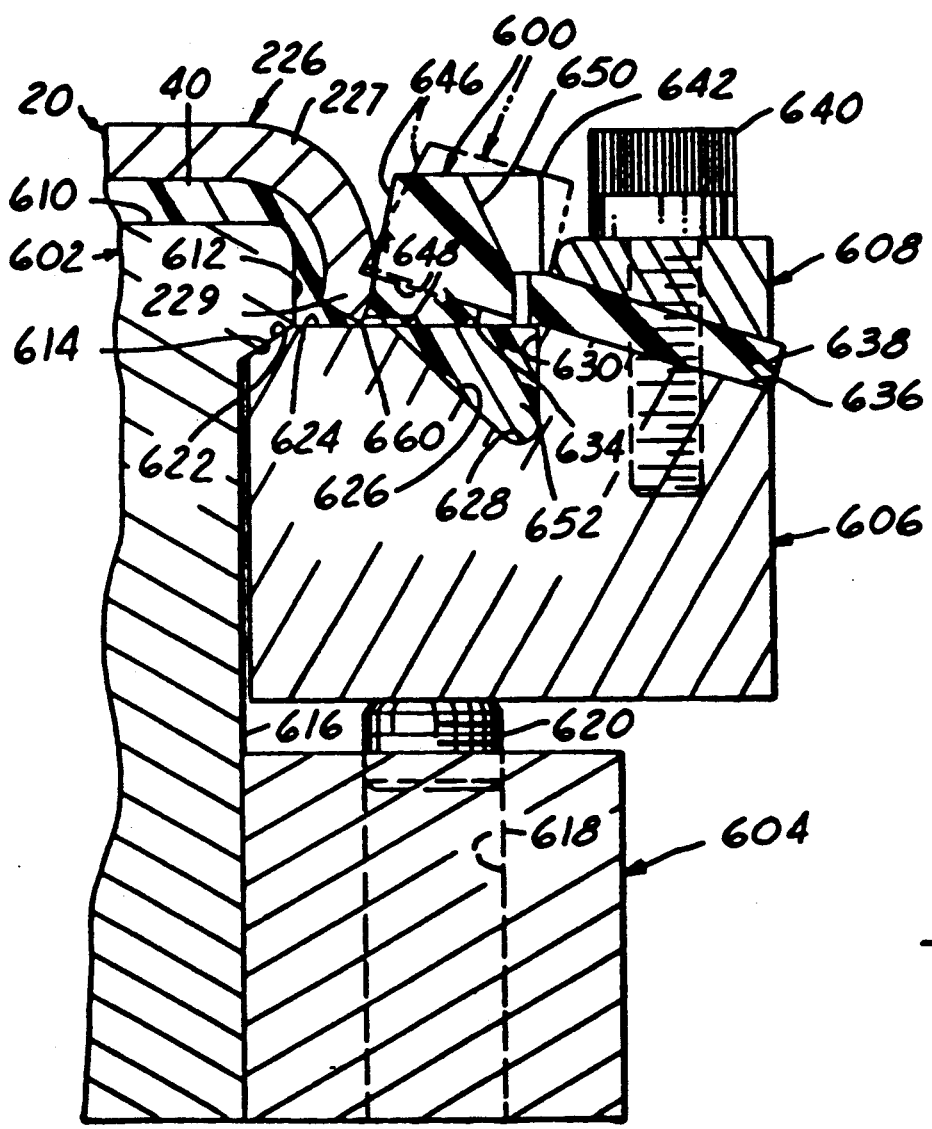
FIG. 15 is a fragmentary vertical cross-sectional view illustrating a fifth embodiment of the vent seal construction of the present invention.

FIG. 15 illustrates a fifth embodiment of a vent seal construction of the invention for making a "full-face" "POLYCAST" wheel with a thin cross-section peripheral portion 40. In this embodiment, which is somewhat similar to the embodiment of FIG. 14, a still further modified perimeter vent seal 600 is provided in conjunction with a modified lower mold part 602 and associated support blocks 604, seal carrier ring 606 and clamping ring 608.

Lower mold part 602 is provided with mold-cavity-defining surfaces 610 and 612 similar to surfaces 230a and 230b described in conjunction with FIGS. 1-4. However, lower mold part 602 is undercut on its outer periphery similar to lower mold part 402 to provide frusto conical, upwardly and outwardly inclined, shoulder surface 614 which extends between the lower edge of surface 612 downwardly to a junction with cylindrical outer peripheral surface 616. A series of support blocks 604, at least three in number, are spaced at equal annular increments around surface 616, and are fixed thereto by suitable means such as by welding or fasteners (not shown). Each support block 604 has a threaded vertical through-bore 618 threadably receiving a screw 620 for adjustably supporting and urging clamping ring 606 against shoulder 614.

Ring 606 is preferably made as a solid ring of steel with a chamfered edge 622 to mate with shoulder 614 of lower mold part 602. Ring 606 has a precision ground annular flat surface 624 extending in a plane radially of the axis of mold part 602 and the wheel part 20 of the mold apparatus. Surface 624 extends from a right angle junction with surface 612 radially outwardly to a flash-receiving trench, similar to trench 520, and defined by a 45° frusto conical surface 626 which converges through a radius 628 with an axially extending cylindrical surface 630, the upper edge of which is co-planar with surface 624. It will be seen that ring 606 is thus positioned to have surface 624 define, in conjunction with surfaces 612 and 610, the peripherally outermost mold cavity surfaces of the lower mold part which in turn cooperate with the outboard surfaces of rim flange portion 227 and its free edge 229 to complete the definition of the outermost peripheral surfaces of the mold cavity.

Seal 600 is somewhat similar to seal 500 and again is made of a flexible material such as silicon rubber and is generally in the form of an annular ring having a flat bottom face 634 which is adapted to seat upon a fructo conical seating surface 636 formed on ring 606 with a 75° inclination relative to the ring axis. Seal 600 has a relatively thin outer peripheral portion 638 which, like portion 514 of seal 500, underlies a complimentarily contoured clamping ring 608 secured by cap screws 640 to ring 606 to thereby removably clamp seal 600 onto ring 606. Seal 600 also has a relatively thick rim engaging portion 642 having a sloping surface 646 defining the radially inward periphery of seal 600. It will be noted that with seal 600 in its free state condition prior to assembly of wheel 20 onto lower mold part 602, portion 642 is disposed with its undersurface 634 undeflected, i.e., inclined in spaced relation away from ring surface 624 and the trench 626-630, as shown in the phantom line position of seal 600 of FIG. 15. Surface 646 in this position is adapted to be yieldably and resiliently engaged in compression by rim flange edge 229 in the mold-closed condition with a predetermined interference fit, which may be approximately 0.5 millimeters in a typical application as illustrated herein.

Thus in the operation of seal embodiment 600, when wheel 20 is fixtured onto lower mold part 602, rim flange edge 229 will engage the sloping surface 646 of seal 600 to slightly compress the same and then force seal portion 642 downwardly (as viewed in FIG. 15) to the solid line position thereof shown in FIG. 15, wherein surface 634 is forced flat against surface 624 at its radially inner edge so that seal 600 closes off the trench 626-630. A series of radially vent grooves 648 are provided in seal surface 634 which extend from the inner edge junction of surfaces 646 and 634 radially outwardly past the radially outer most edge of ring surface 624 to provide communication with the flash trench. In one working embodiment, grooves 640 are spaced equally on 5° centers and may be 1/32 inch in depth and 5/32 inch in length radially of the mold axis. One or more funnel shaped vents 650 may be provided in portion 642 of seal 600 (shown in the solid line position of portion 642 in FIG. 15) to thereby vent trench 626-630 to exterior atmosphere.

Assuming that wheel 20 and lower mold part 602 have been fixtured as shown as FIG. 15 to thereby deflect seal 600 to the solid line position shown in FIG. 15, during the mold filling operation the urethane reaction mixture will flow outwardly to first form the thin-cross-section portion 40, and then will continue outwardly beyond the wheel rim edge 229, with excess foam flowing via grooves 648 into the trench passageway 626-630. Cavity air is expelled ahead of the advancing foam via trench passageway 626-630 through vent 650 to exterior atmosphere. At the completion of the molding filling operation, flash will have filled the trench as well as vent 650.

It will be noted that in the embodiment of FIG. 15, rim flange 227 is shown seated with its outboardmost edge 160 of rim free end 229 contacting ring surface 624. However, it is to be understood that, although ring surface 624 is a precision ground true planar surface, the same is not true of the free edge 160 of the wheel rim. Rather, due to the customary manufacturing irregularities and relatively large lateral run-out tolerances permitted for the free edge of the outboard rim flange, the outboardmost rim edge 160 will depart from a plane and define an undulating path circumferentially around the wheel rim due to the typical tolerance variation in a direction axially of the wheel from the nominal planar position of the rim flange free edge. Hence, even when wheel 20 is tightly fixtured against lower mold part 602 and its associated ring 606, gaps will remain between rim edge 660 and surface 624 which are circumferentially spaced peripherally around rim flange 227. It has been found, in accordance with the present invention as expressed in this embodiment, that these unavoidable seating gaps are sufficient to serve as peripheral air vent openings for the mold cavity, the same having sufficient flow cross section to adequately vent air ahead of the foam filling the mold cavity to thereby avoid molding defects in the urethane reaction material in thin portions 40 and 40a. The urethane will also flow through these peripherally spaced seating gaps, and, after cure, will form connecting portions between portion 40a and the flash ring 652 formed in trench 626-630.

During demolding, flash ring 652 will be pulled upwardly with the wheel. This stripping action will cause the portion 642 of seal 600 to flex upwardly (from the trench-closing solid line position illustrated in FIG. 15 to the free-state phantom line position shown in FIG. 15) with a hinge-like action to thereby release flash ring 652 from the mold as the flash is lifted upwardly by and with the wheel, similar to the action of seal 500 described previously. A portion of the flash entrapped in vent 650 will fracture or shear off at its junction with the upper face of flash ring 652 at the underface 634 of seal 600 during the demolding operation.

Seal embodiment 600, like seal embodiment 500 is thus self cleaning with respect to lower mold 602 and associated ring 606, and requires only that the one vent opening 650 be cleaned after each molding operation. Again, the funnel formed in vent opening 650 has a geometry which renders the same relatively easy to pop-out of the seal after the molding operation. The residual flash ring 652 and its attachment portion formed in vent grooves 648 and in the peripheral rim-seating-gap portions described previously may again be shaved from the wheel by a suitable knife trimming operation. The outer periphery of portion 40a will have a radial face defined by mold surface 624 which at its juncture with rim edge 660, will vary in thickness circumferentially around edge 660 from substantially zero thickness axially of the wheel (where edge 660 contacted surface 624) up to a thickness defined by the maximum lateral tolerance variation encountered in the formation of flange edge 229. Hence, separation of the flash radially outwardly of edge 660 can be accomplished very readily with a simple knife trimming operation, or even by merely pulling flash ring 652 axially inboard relative to the rim edge of the wheel to shear the gap-formed connecting portions.

It will also be understood that with the embodiment of FIG. 15 the urethane surface formed at ring cavity surface 624 will, like the urethane cast against surfaces 610 and 612, be denser and non-pourous due to the self skinning action of the urethane reaction mixture against these mold surfaces. The finished wheel will thus have an unblemished and defect-free decorative outboard face plastic surface with little if any penetration of the self-skinning surface occassioned by the deflashing operation. The desirable "full-face" appearance imparted by the molded-on urethane decorative body will thus be enhanced and maximized radially outwardly of the wheel, but without any of the urethane reaction material remaining on the radially outer surface of rim flange 227.

It is possible, of course, that a 360° full line contact may occur between rim edge 660 and ring surface 624, but this is a highly unlikely condition to occur in practice, absent a true machining operation being formed on rim edge 660 subsequent to roll forming of the rim. However, should this full-seating condition be anticipated with a given wheel type, the outer rim edge 660 may be subjected to a mold operation in which a suitable knurling tool (not shown) is employed to slightly cold work edge 660 around part or all of its circumferential extent to thereby form a series of shallow, radially-extending grooves (not shown) defined by the ridges and valleys alternately formed by the knurling tool serations. Such knurled-in-grooves in the rim free edge 660 insure a predetermined minimum air venting flow cross-section in the rare circumstance wherein wheel 20 is formed having zero lateral run-out tolerance variations along edge 660 circumferentially of the wheel.

From the foregoing description, it now will be apparent that each of the aforementioned venting seal embodiments 224, 400, 450, 500 and 600 enables the production of a "POLYCAST" wheel construction with a defect-free thin-section peripheral plastic portion covering the steel wheel flange to thereby achieve a "full-face" look. With the vent seal system of the invention the outer periphery of the wheel mold cavity at the rim flange edge is sealed against undesirable leakage of urethane foam during the molding operation by a venting construction capable of both reliably relieving trapped air and of being kept open in subsequent pours on a reliable, consistent and economical basis. The vented foam flashing may be readily trimmed from the decorative urethane body adhered to the steel rim to thereby produce a styled wheel with a smooth clean flange having a pleasing appearance with less material and weight than prior art constructions.

From the foregoing description, it also will now be apparent that the improved composite styled metal-elastomer wheel construction of the present invention achieves increased styling versatility for the wheel designer by enabling placement of outboard vent pockets of greater number and smaller size as well as widely varying shapes, closer to the outer periphery of the outboard face of the wheel, without sacrificing flow-through air ventilation. The improved wheel construction of the invention also enables a true "full-face" appearance to be achieved on the outboard side of the wheel with a complete overlay of the elastomer material. This feature cooperates from both a functional and styling standpoint the achievement of a larger diameter pocket circle in the decorative wheel face, enables the use of standard design wheel weights and eliminates the need for an auxiliary trim ring.

It will also now be apparent that the present invention provides an improved mold apparatus and method for constructing the improved wheel construction which satisfies the aforementioned objects, resulting in reduced processing and material costs without thereby increasing the time required to injection-fill the mold cavity.

It is also to be understood that, although the foregoing description and drawings describe and illustrate in detail various successful working embodiments of the present invention, to those skilled in the art to which the present invention relates, the present disclosure will suggest many modifications in construction as well as widely differing embodiments and applications without thereby departing from the spirit and scope of the invention. For example, the vented seal construction of the first embodiment may be employed to achieve a complete "full-face" decorative elastomeric overlay on the outboard face of the wheel while employing the un-split core construction of the aforementioned prior art patents. As illustrated in the second embodiment, the outboard face pockets can be moved radially further outwardly on the outboard face of the wheel by employing the split-core mold construction of the present invention but utilizing a less than full-face mold if it is desired to use standard steel wheel balance weights clipped to the outboard rim flange and covered by a trim ring as in the prior art. The present invention, therefore, is intended to be limited only by the scope of the appended claims and the applicable prior art.

We claim:

1. In a composite styled wheel including in combination a metallic portion comprising a wheel mounting disc and a rim secured to said disc and adapted to receive a tire thereon, said disc having a circular row of air vent openings therethrough, and a plastic portion comprising an ornamental overlay disposed adjacent and covering at least part of the outboard face of said metallic portion, said overlay comprising a body of plastic material permanently affixed to said metallic portion, the outboard face of said body being exposed to view from the outboard side of said wheel having a contour differing from the contour of the covered part of the outboard face of said metallic portion and adapted to provide decorative contour over at least part of the metallic portion of said wheel, said covered part of said metallic portion comprising said disc and said disc having a central aperture and wheel mounting fastener holes therein, said overlay having aperture means registering coaxially with said central aperture and holes in said disc and defining a central cavity in said body adapted to receive wheel hub and mounting parts therein, the improvement wherein said overlay body has a circular row of outboard pockets spaced radially outwardly from said overlay aperture means and opening at the outboard face of said overlay body, and a circular row of inboard pockets individually registering at their inboard ends with associated ones of said disc vent openings for air flow communication therebetween and individually juxtaposed in axial offset and radial overlapping relation to associated ones of said outboard pockets, said overlay body having window openings providing air flow communication between associated airs of said inboard and outboard pockets, each of said outboard and inboard pockets terminating, in a direction axially of said wheel, in a generally radially extending blind bottom wall, said bottom wall of each of said outboard pockets being disposed axially inboard of said wheel relative to said bottom wall of the associated one of said inboard pockets.

2. A wheel as set forth in claim 1 wherein said rim has an outboard tire bead retaining flange with a generally axially extending free end portion defining the outboard perimeter of said disc and rim subsassembly, and wherein said overlay body extends radially outwardly to said rim free end portion and has a relatively thin cross-section in the portion thereof juxtaposed to said rim outboard flange.

3. An improved composite metal-elastomer styled automotive-type wheel comprising a metal rim and disc wheel having a plastic overlay body permanently affixed to the outboard face of said disc to form a three-dimensionally contoured ornamental outboard face, said disc has a circular row of air vent openings, said plastic overlay body having an annular row of outboard pockets, and an annular row of inboard pockets each disposed in radially offset, axially overlapping relation with an associated one of said outboard pockets, said inboard pockets each having an opening communicating in air flow communication with the associated one of said outboard pockets in the area of mutual overlap therewith, said inboard pockets individually registering in air flow communication with said vent openings in the disc to thereby provide with the associated one of said outboard pocket an associated air passage through the wheel for brake ventilation, each of said outboard and inboard pockets terminating, in a direction axially of said wheel, in a generally radially extending blind bottom wall, said bottom wall of each of said outboard pockets being disposed axially inboard of said wheel relative to said bottom wall of the associated one of said inboard pockets.

4. The wheel as set forth in claim 3 wherein the outboard pockets are disposed radially remote from the center of the wheel close to said wheel rim, and a relatively thin cross-section of plastic material is molded so as to overlie the outboard rim flange to provide a full-face appearance to the wheel.

* * * * *